United States Patent
Flores et al.

(10) Patent No.: US 8,005,650 B2
(45) Date of Patent: Aug. 23, 2011

(54) ENHANCED FLATTENING FOR CABLE AND WIRING HARNESSES IN COMPUTER-AIDED DESIGN DRAWINGS

(75) Inventors: Steve Flores, Beaverton, OR (US); Baolin Jiang, Shanghai (CN); Wang Xianfeng, Shanghai (CN); Chengyun Yang, Shanghai (CN)

(73) Assignee: Autodesk, Inc., San Rafael, CA (US)

( * ) Notice: Subject to any disclaimer, the term of this patent is extended or adjusted under 35 U.S.C. 154(b) by 666 days.

(21) Appl. No.: 12/039,617

(22) Filed: Feb. 28, 2008

(65) Prior Publication Data

US 2009/0222121 A1 Sep. 3, 2009

(51) Int. Cl.
*G06F 17/50* (2006.01)
(52) U.S. Cl. .......................................................... 703/1
(58) Field of Classification Search ...... 703/1; 439/204, 439/607.15, 694, 697, 739; 700/98
See application file for complete search history.

(56) References Cited

U.S. PATENT DOCUMENTS 5,915,424 A * 6/1999 Franks et al. ................ 140/92.1
2005/0091628 A1 * 4/2005 Kragh et al. .................... 716/13

OTHER PUBLICATIONS

Autodesk Inventor Pro, Chapter 14, pp. 241-255, Working with the Nailboard, 2004.*

* cited by examiner

*Primary Examiner* — Paul L Rodriguez
*Assistant Examiner* — Andre Pierre Louis
(74) *Attorney, Agent, or Firm* — Patterson & Sheridan, LLP (57) ABSTRACT

Embodiments of the invention include a method for generating a two-dimensional (2D) flattened nailboard representation of a wiring harness in a three-dimensional (3D) computer-aided design (CAD) model. The nailboard representation invention may be used to provide a dimensionally accurate "flattened" view of a complex 3D wiring harness depicted in a CAD model, without cutting any of the wires included in the harness, and minimizing the overlap of multiple exposed wires present in wire loops.

18 Claims, 6 Drawing Sheets

ENHANCED FLATTENING FOR CABLE AND WIRING HARNESSES IN COMPUTER-AIDED DESIGN DRAWINGS

BACKGROUND OF THE INVENTION

1. Field of the Invention

The present invention generally relates to computer software. More specifically, the present invention relates to a method and system for a computer-aided design (CAD) application to "flatten" three-dimensional representations of cable and wiring harnesses in CAD drawings.

2. Description of the Related Art

The term computer-aided design (CAD) generally refers to a broad variety of computer-based tools used by architects, engineers, and other construction and design professionals. CAD applications may be used to construct computer models representing virtually any real-world construct. Commonly, CAD applications are used to compose three-dimensional (3D) computer models and drawings of electrical wires and connectors harnesses that provide electrical connectivity for some device. For example, a CAD application may be used to create a 3D model of a wiring harness for components of an automobile engine or of the wiring within a personal computer or network hardware device.

Additionally, such models may be used to generate, assembly, engineering, and other documentation related to the modeled device. For example, 3D CAD models such as these may be used to generate two-dimensional (2D) layouts for the cable and wire harness designs modeled in the 3D CAD environment. Unlike projected views of typical 3D design data, cables and wires are 'flattened' to a "nailboard," which provides a 2D representation of the wires included in the design of a wiring harness.

Often, a wiring harness includes segments where multiple wires are routed along a common path and segments where individual wires are routed along distinct paths. A "wire loop" occurs when a closed loop is formed by two or more wires are routed apart from one another in between common segments. Wire loops can range from a single wire loop to multiple wire loops to complex wire loops with multiple nested segments. When "flattening" a 3D wiring harness, it is important that the length of each wire in the 2D "flattened" representation be the same as modeled length of the wires in the 3D model. However, when "flattening" a complex wiring harness, currently available CAD application simply "cut" wires as needed to generate the flattened 2D nailboard representation. While this approach allows the dimensional lengths in the nailboard representation to be correct, it leaves users to manually determine the total length of the wire. Further, while accurately measuring the length, such a nailboard representation is not useful for manufacturing the actual wiring harnesses depicted by the CAD model and nailboard representation.

As the foregoing illustrates, there is a need in the art for teachings for generating a "flattened" 2D representation of a cable and wiring harness depicted in a 3D CAD model.

SUMMARY OF THE INVENTION

Embodiments of the invention include a method for generating a two-dimensional (2D) flattened nailboard representation of a wiring harness in a three-dimensional (3D) computer-aided design (CAD) model. The method includes identifying a wire-loop in the wiring harness. A wire-loop includes a plurality of exposed wires connecting a first segment and a second segment of the wiring harness. The first and second segments generally represent a portion of the wiring harness where the plurality of exposed wires is routed along a common path. The method also includes determining a position for the first segment and the second segment in the nailboard representation, adding the first segment and the second segment to the nailboard representation at the determined positions, and adding each of the plurality of exposed wires of the wire loop to the nailboard representation as a contiguous sequence of linear segments. The length of the contiguous sequence of linear segments for each of the plurality of exposed wires in the nailboard representation equals a length of a corresponding wire in the wiring harness. Once generated, the method may also include storing the nailboard representation of the wiring harness in the 3D CAD model.

The method for generating a 2D flattened nailboard representation of a wiring harness may be adapted to account for a number of variations that may occur in a wire loop. For example, the wire loop may include multiple segments of equal length, or the wiring harness may include multiple wire loops separated by a nested segment.

Advantageously, embodiments of the invention may be used to provide a dimensionally accurate "flattened" representation of a complex 3D wiring harness depicted in a CAD model, without cutting any of the wires included in the harness. Thus, the nailboard representation may be used as a manufacturing template for building the complex 3D wiring harness mode by the CAD application.

DETAILED DESCRIPTION OF THE PREFERRED EMBODIMENTS

Embodiments of the invention may be used to provide a dimensionally accurate "flattened" 2D representation of a complex 3D wiring harness depicted in a CAD model, without cutting any of the wires included in the harness. In one embodiment, the nailboard view represents each wire of the wiring harness as a contiguous (i.e., uncut) sequence of linear segments, where the overall length of each wire corresponds to the modeled length of the wires in the CAD model. When all of the wires are routed along a common path, the nailboard view may represent such wires as a single segment. For wire loops, the nailboard view may minimize overlap for wires routed along different paths.

The flattened representation may be useful for both bill of material calculations that include a cost calculation based on the length of the wires included in the harness as well as provide a template for manufacturing the wiring harness depicted in the 3D model.

Figure 1:
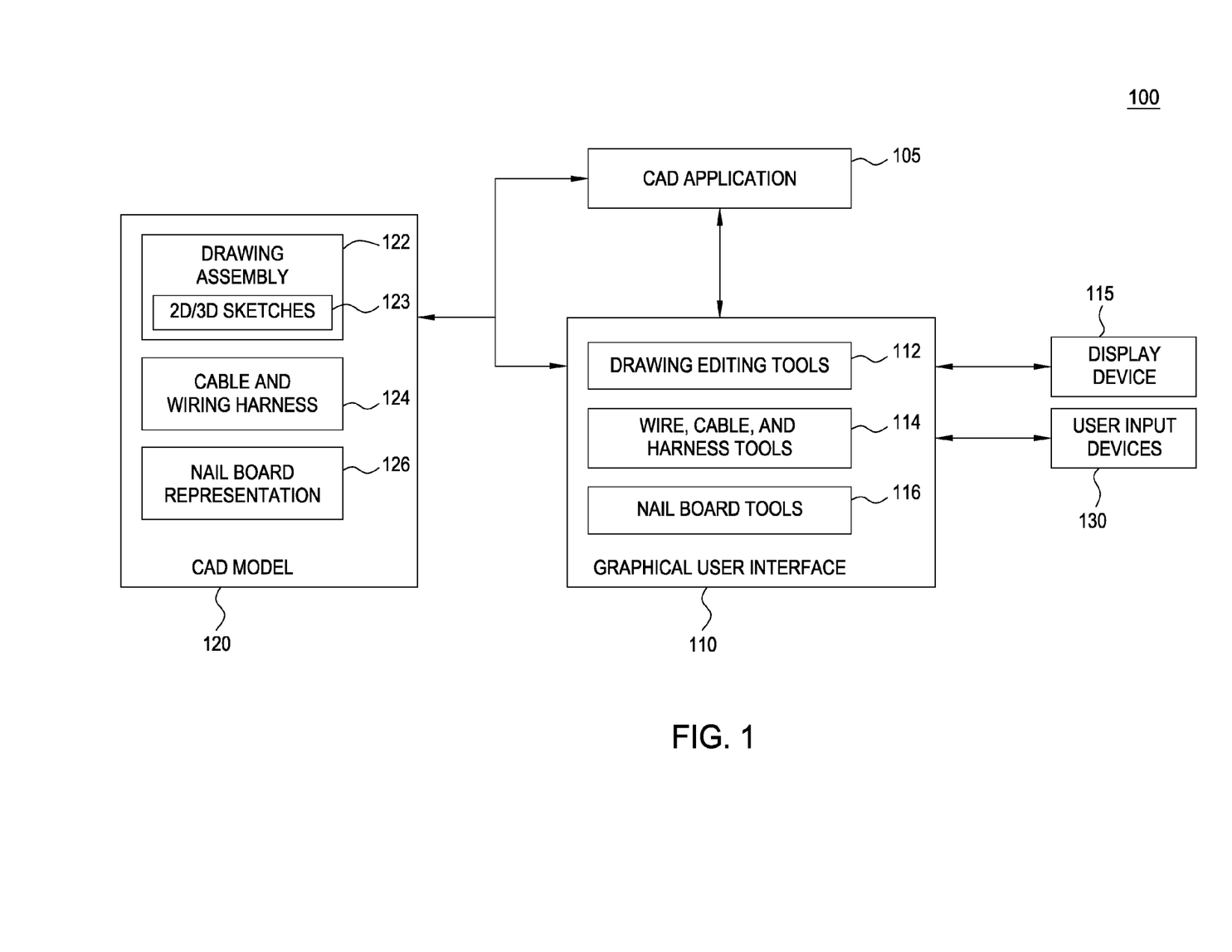
FIG. 1 is a block diagram illustrating components of a system used to flatten 3D representations of cable and wire harnesses in CAD drawings, according to one embodiment of the invention.

FIG. 1 is a block diagram illustrating components of system 100 used to flatten 3D representations of cable and wire harnesses in CAD drawings, according to one embodiment of the invention. The components illustrated in system 100 may include computer software applications executing on existing computer systems, e.g., desktop computers, server computers, laptop computers, tablet computers, and the like. The software applications described herein, however, are not limited to any particular computing system and may be adapted to take advantage of new computing systems as they become available.

Additionally, the components illustrated in system 100 may be implemented as software applications that execute on a single computer system or on distributed systems communicating over computer networks such as local area networks or large, wide area networks, such as the Internet. For example, a graphical user interface 110 may include a software program executing on a client computer system at one physical location communicating with CAD application 105 at another physical location. Also, in one embodiment, CAD application 105 and graphical user interface 110 may be provided as an application program (or programs) stored on computer readable media such as a CD-ROM, DVD-ROM, flash memory module, or other tangible storage media.

As shown, system 100 includes, without limitation, CAD application 105, graphical user interface 110, a CAD model 120, user input devices 130, and a display device 115. CAD application 105 may be configured to allow users interacting with GUI interface 110 to compose a CAD model 120. Accordingly, CAD application 105 and GUI interface 110 may include programmed routines or instructions allowing users to create, edit, load, and save CAD model 120. In one embodiment, the Autodesk® Inventor™ application program (and associated utilities) may be used. Those skilled in the art will recognize, however, that the components shown in FIG. 1 are simplified to highlight aspects of the present invention and that a typical CAD application 105 and GUI interface 110 may include a broad variety of additional tools and features used to compose and manage CAD model 120.

Illustratively, CAD model 120 includes a drawing assembly 122, a cable and wiring harness 124, and a nailboard representation 126. Drawing assembly 122 provides a virtual three-dimensional (3D) representation of a real-world object. Wiring harness 124 represents drawing elements used to create a 3D model of a cable and wiring harness that are included as part of the object being modeled. For example, common drawing elements of wiring harness 124 includes connectors, wires of various lengths, gauges, and colors, segments of the harness where groups of wires are routed along a common path, Nailboard representation 126 provides a 2D flattened representation of wiring harness 124.

In one embodiment, GUI 110 allows users to compose and edit solid model assembly 122. For example, the Autodesk Inventor™ application provides a parametric modeling tool used by designers and engineers to produce and perfect new products. Whereas in non-parametric CAD programs the dimensions are geometry-driven, a parametric modeling application allows the geometry of solid model assembly 122 to be dimension-driven. That is, if the dimensions are altered, the geometry automatically updates based on the altered dimension. Using the Autodesk Inventor™ application, users compose solid model assembly 122 by first designing certain parts. The parts may then be combined to form solid model assembly 122. Parts are composed from one or more sketches 123. For example, in order to compose a solid model assembly of a simple cube, a user would first create a sketch having a square within a two-dimensional (2D) plane, and then use an extrude tool to create the three dimensional cube. The user could then add a shaft extending from cube by adding a sketch to the desired face of the cube, sketch a circle, and then extruding that circle to create a shaft. The cube and shaft may then be connected to other parts to form solid model assembly 122.

New assemblies can consist of both parts and other assemblies. The parametric modeling approach used by the Inventor™ application allows users to create three-dimensional models having virtually any desired level of detail. Further, a variety of pre-modeled elements may be supplied with CAD application 105. In the context of the present invention, for example, pre-modeled elements may include elements representing wires, connectors, and fasteners typically present in a cable and wire harness. Of course, one of ordinary skill in the art will recognize that embodiments of the invention may be adapted for use with non-parametric modeling applications.

Also as shown, GUI 110 includes drawing and editing tools 112, cable and wiring harness tools 114 and nailboard tools 116. Drawing and editing tools 112 may allow users to create, edit, and save, and otherwise generally interact with GUI 110 to compose a CAD model 120. Cable and wiring harness tools 114 represent elements of GUI 110 that allow users to create cable and wiring harness 126 within CAD model 120. For example, cable and wiring harness tools 114 may allow users to add wire connectors to CAD model 120, add connecting wires, route the paths of the wires, specify the physical, display or meta properties of these wires, etc. Nailboard tools 116 may be configured to use the drawing elements included in wiring and cable harness 124 and generate a 2D nailboard representation 126 of that harness.

Figure 2A:
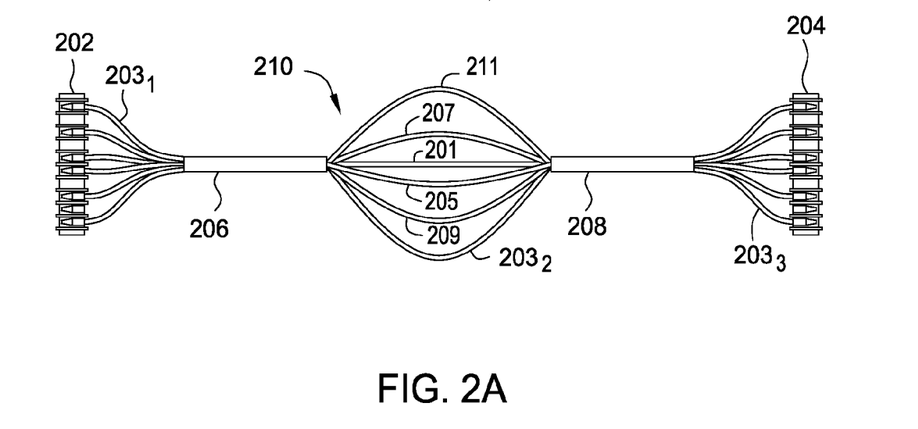
FIG. 2A illustrates a 3D CAD model of a wiring harness with a wire loop, according to one embodiment of the invention.

FIG. 2A illustrates a 3D CAD model of a wiring harness 200 with a wire loop 210, according to one embodiment of the invention. As shown, wiring harness 200 includes connectors 202 and 204, a first segment 206, a second segment 208, and wire loop 210. Wire loop 210 includes wires 201, 203, 205, 207, 209, and 211. Illustratively, wiring harness 200 includes six individual wires, each connected to connector 202. The six individual wires exit connector 202 and converge at the entry to segment 206. Within segment 206, all six wires are routed along a common path. Similarly, on the other side of wire loop 210, the six wires are routed through segment 208 where they then fan out into connector 204. Between segment 206 and 208 is wire loop 210, which shows each of the six wires 201, 203, 205, 207, 209, and 211 routed along a different path and having a different length. For example, wire 203 includes a first portion $203_1$ routed from connector 202 into segment 206. Wire 203 also includes a second portion $203_2$ between segments 206 and 208. Lastly, wire 203 also includes a third portion $203_3$ where wire 203 is routed from segment 208 into connector 204. Additionally, wire 203 includes portions that traverse segments 206 and 208 along with the other five wires of wiring harness 200.

Figure 2B:
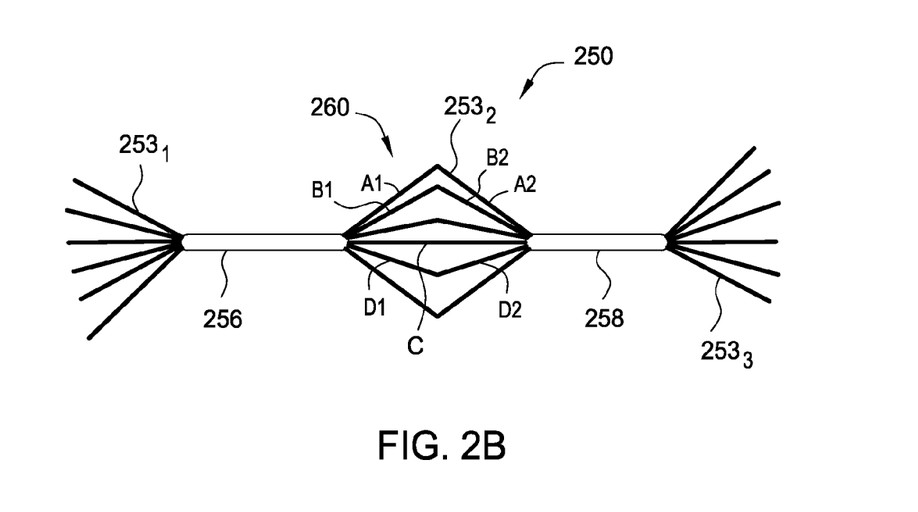
FIG. 2B illustrates a flattened nailboard representation of a wiring harness generated from the wiring harness of FIG. 2A, according to one embodiment of the invention.

FIG. 2B illustrates a flattened nailboard view 250 of wiring harness 200 of FIG. 2A, according to one embodiment of the invention. Nailboard view 250 provides an accurate 2D representation of the wires in 3D wiring harness 200. In one embodiment, nailboard view 250 may represent each wire present in a 3D model of a wiring harness as a set of contiguous linear segments. At either end of nailboard view 250, the six wires of FIG. 2A are shown using six, non-overlapping linear wires fanning out from the ends of segments 256 and 258. The length of each of these linear wires in nailboard view 250 corresponds to the length of the wires routed from connectors 202 and 204 in wiring harness 200. For example, a nailboard segment 253, corresponds to the first portion $203_1$ of wire 203 and a nailboard segment $253_3$ corresponds to the third portion $203_3$ of wire 203. Similarly, the lengths of segment 256 and segment 258 in nailboard view 250 correspond to the lengths of segments 206 and 208 in wiring harness 200.

To provide a 2D representation of wire loop 210, nailboard view 250 shows a flattened loop 260, where the six wires of wire loop 210 are distributed evenly above and below a shortest wire loop segment (segment C). In flattened loop 260, segment C is drawn as a linear wire connection between segments 256 and 258. Segment C corresponds to the shortest exposed wire in wire loop 210 (i.e., wire 201).

To represent the remaining five wires in the flattened 2D nailboard view 250, each of these wires is drawn in flattened loop 260 using two linear segments that form a "V" half-diamond shape. For example the nailboard view 250 shows the third portion $203_2$ of wire 203 using two linear segments (A1 and A2). Added together, the length of these two linear segments corresponds to the length of wire $203_2$. Thus, nailboard view 250 accounts for the differences in lengths of the wires in wire loop 210, without "cutting" any of the individual wires to generate flattened loop 260.

Figure 3:
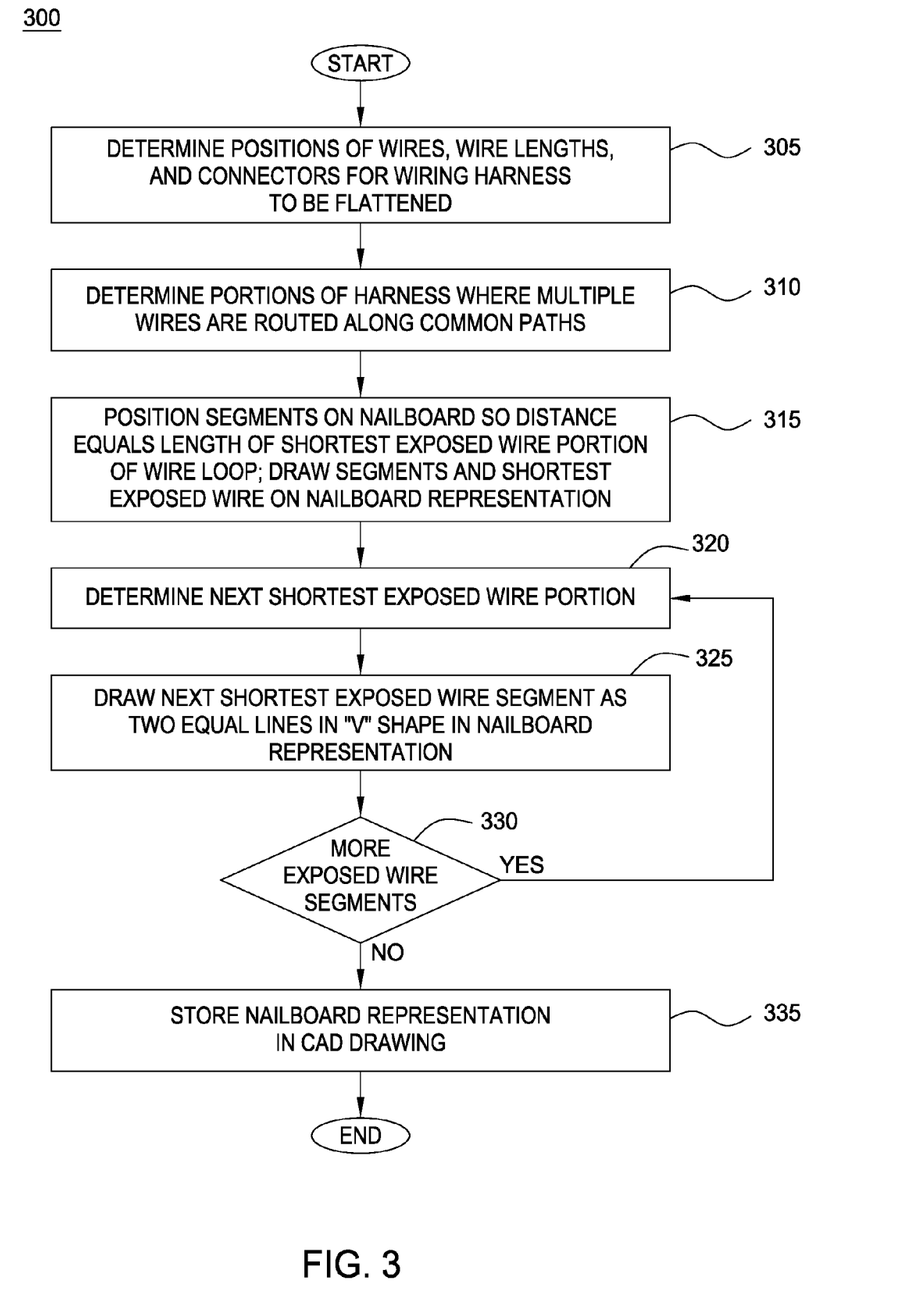
FIG. 3 illustrates a method for generating a 2D flattened nailboard representation of a cable and wiring harness in a 3D CAD model, according to one embodiment of the invention.

FIG. 3 illustrates a method 300 for generating a 2D flattened nailboard representation of a cable and wiring harness in a 3D CAD model that includes a wire loop, according to one embodiment of the invention. Persons skilled in the art will understand that, although method 300 is described in conjunction with the systems of FIG. 1, any system configured to perform the steps of method 300, in any order, is within the scope of the present invention. Additionally, method 300 is described being used to generate nailboard view 250 of FIG. 2B generated from wiring harness 200 of FIG. 2A.

As shown, method 300 begins at step 305 where the position of connectors and wires present in a wiring harness are determined. In one embodiment, for example, a user may interact with a nailboard tool 116 provided as part of a GUI 110 and CAD application 105 to select a wiring harness to be flattened. In response, the nailboard tool 116 may be configured to parse the selected cable and wiring harness included in CAD model 120 to determine the relative positions of harness connectors, wire endpoints, and wire lengths.

At step 310, nailboard tool 116 may identify portions of the wiring harness where multiple wires are routed along common path. For example, the six wires of wiring harness 200 of FIG. 2A are each routed along a common path at segments 206 and 208. At step 315, nailboard tool 116 may add the segments identified at step 310 to the nailboard representation being generated. In one embodiment, nailboard tool 116 draws segments on the nailboard representation such that the distance between the segments is equal to the length of the shortest exposed wire portion. Also, the shortest exposed wire portion may be drawn as a straight line connecting the two segments. For example, the wire labeled C in flattened loop 260 corresponds to the shortest exposed wire present in wire loop 210. Additionally, the linear segments for each of the six wires on the outer sides of segments 256 and 258 may be added to the nailboard representation being generated. That is, the portion of exposed wires in the wiring harness that are not part of a wire loop may be added to the nailboard representation.

At step 320, the next shortest exposed wire of the wire loop being flattened is determined. That is, nailboard tool 116 may identify the shortest wire segment that has not already been added to the nailboard representation being generated. At step 325, the wire identified at step 320 is flattened and added to the nailboard representation. For example, in FIG. 2A the next shortest wire is wire 205. To flatten this wire, nailboard tool 116 creates the two v-shape segments B1 and B2 of FIG. 2B, each equal to half of the length of exposed wire 205. These segments are then drawn on the nailboard representation being generated. As shown in FIG. 2B, segments B1 and B2 are drawn on the nailboard representation above the shortest wire.

At step 330, the nailboard tool 116 may determine whether more exposed wires are present in the wire loop. For example, wire loop 210 of FIG. 2A includes 6 wires, and the next smallest exposed wire portion is wire 207. Like wire 205, wire 207 is represented in the nailboard by creating two linear v-shape segments (D1 and D2), where each segment is equal to half of the length of exposed wire 207. These segments are then drawn on the nailboard representation being generated. As shown in FIG. 2B, segments D1 and D2 are drawn on the nailboard representation below the shortest wire. In one embodiment, nailboard tool 116 may alternate between being drawing exposed wire portions above and below the shortest wire in order to minimize overlap between exposed wire segments of a wire loop.

After segments D1 and D2 are drawn on the nailboard representation, nailboard tool 116 may repeat steps 320 and 325 to add each remaining exposed wire portion of a wire loop being flattened to the nailboard representation. Thus, for the example shown in FIGS. 2A and 2B, steps 320 and 325 are repeated three more times to add a flattened representation of wires 209, 211 and 203. Each of these wires is drawn using two linear segments of equal length in a v-shape. At step 335, nailboard tool 116 may stored the nailboard representation as part of the CAD model 120.

Figure 4A:
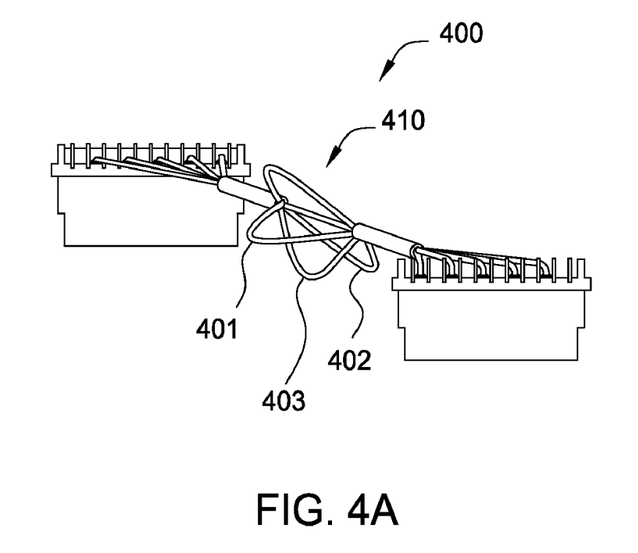
FIG. 4A illustrates a 3D model of a wiring harness with a wire loop having multiple exposed wire portions of the same length, according to one embodiment of the invention.

The method 300 for generating a 2D flattened nailboard representation of a cable and wiring harness may be adapted to account for a number of variations that may occur in a wire loop. For example, wire loop 210 of FIG. 2A includes multiple wire segments where each of the individual wires in the wire loop are of different lengths. In some cases, however, a wiring harness modeled by a CAD application may include a wire loop with multiple wires of the same length. FIG. 4A illustrates a 3D model of a wiring harness 400 with a wire loop having multiple exposed wire portions of the same length, according to one embodiment of the invention. Specifically, in this example, wires 401, 403, and 405 are all the same length.

Figure 4B:
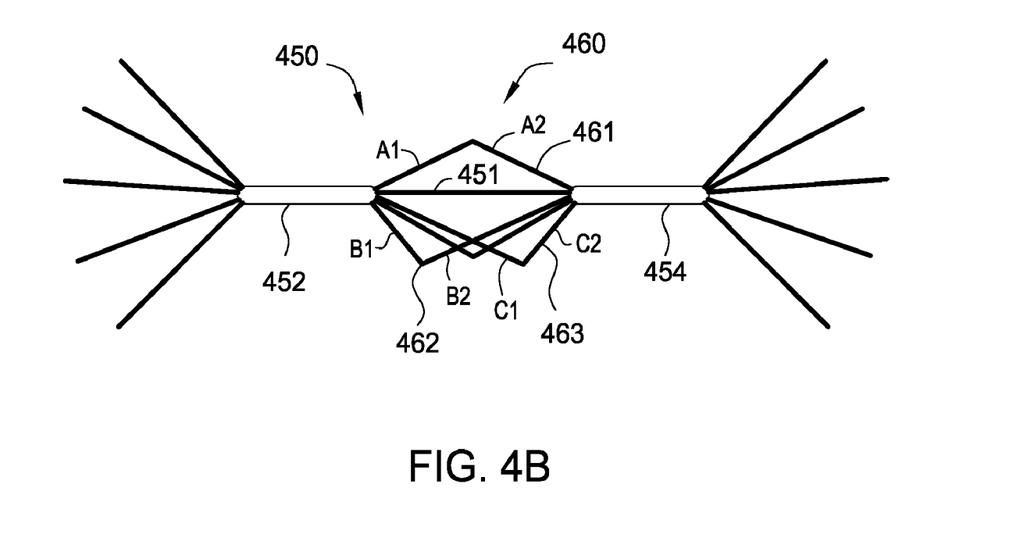
FIG. 4B illustrates a flattened nailboard representation of a wiring harness generated from the wiring harness of FIG. 4A, according to one embodiment of the invention.

FIG. 4B illustrates a flattened nailboard view 450 of wiring harness 400 generated from the wiring harness of FIG. 4A, according to one embodiment of the invention. To generate nailboard view 450, segments 452 and 454 are added to nailboard view (step 310 of method 300) and a shortest exposed wire portion, wire 451, is drawn to connect segment 452 and 454 (step 315 of method 300). If the wire loop being flattened includes more than one exposed wire portion that are equal in length and that are also shortest exposed wires, then these wires may be drawn as a straight line connecting the segments that include all the wires of the harness.

For the remaining exposed wires, if the wire loop being flattened includes two exposed wire portions that are that are the same length, then these wires may be drawn on the nailboard representation according to method 300 of FIG. 3, where one of the two wires is drawn above the shortest wire and the other is drawn below the shortest wire. However, if the wire loop being flattened includes more than two exposed wires that are equal in length, then these wires may be added to the nailboard representation by creating multiple v-shape segments, where the sides of the "v" are drawn using different lengths. For example, wire loop 410 includes three exposed wire portions 401, 402, and 403 of equal length. To flatten these three segments, one may be drawn on one side of the shortest exposed wire and the other two segments may be drawn on the other side of the shortest exposed wire.

On the side where multiple segments are drawn, the sides of the half diamond v-shaper may be unequal. In one embodiment, the length of the first line of the v-shape may be determined according to the following formula:

$$B1 = \left(\frac{1}{N+1}\right) * \left(\begin{array}{c}\text{Exposed Wire}\\ \text{Portion Length}\end{array}\right) * W$$

where B1 equals the length for the first line of the v-shape, N represents the number of v-shaped wires that need to be drawn on the same side of the flattened wire loop (i.e., above or below the shortest exposed wire), and where W represents which of the multiple segments is being drawn. The length of the second line of the v-shape may be determined according to the following formula:

$$B2 = \left(\begin{array}{c}\text{Exposed Wire}\\ \text{Portion Length}\end{array}\right) - B1$$

As can be seen from these formulas, when added together, the length of the two lines of the v-shape correspond to the length of the exposed wire portion being flattened. Using these formulas allows the flattened representation of multiple wires to be evenly distributed in a nailboard view, minimizing overlap between individual segments of a complex wire loop. FIG. 4B illustrates the results of this process for flattening exposed wires 401, 402, and 403 from wire loop 410. As shown nailboard view 450 includes flattened loop 460. The flattened representation of wires 401, 402 and 403 are flattened wires 461, 462, and 463, respectively. Wire 461, includes segments A1 and A2 of equal length. The remaining two wires of equal length, wires 462 and 463, are drawn where the two sides of the v are of unequal length. Wire 462 is drawn using segments B1 and B2 and wire 463 is drawn using segments C1 and C2. The length of these segments may be determined using the formulas given above.

Figure 5:
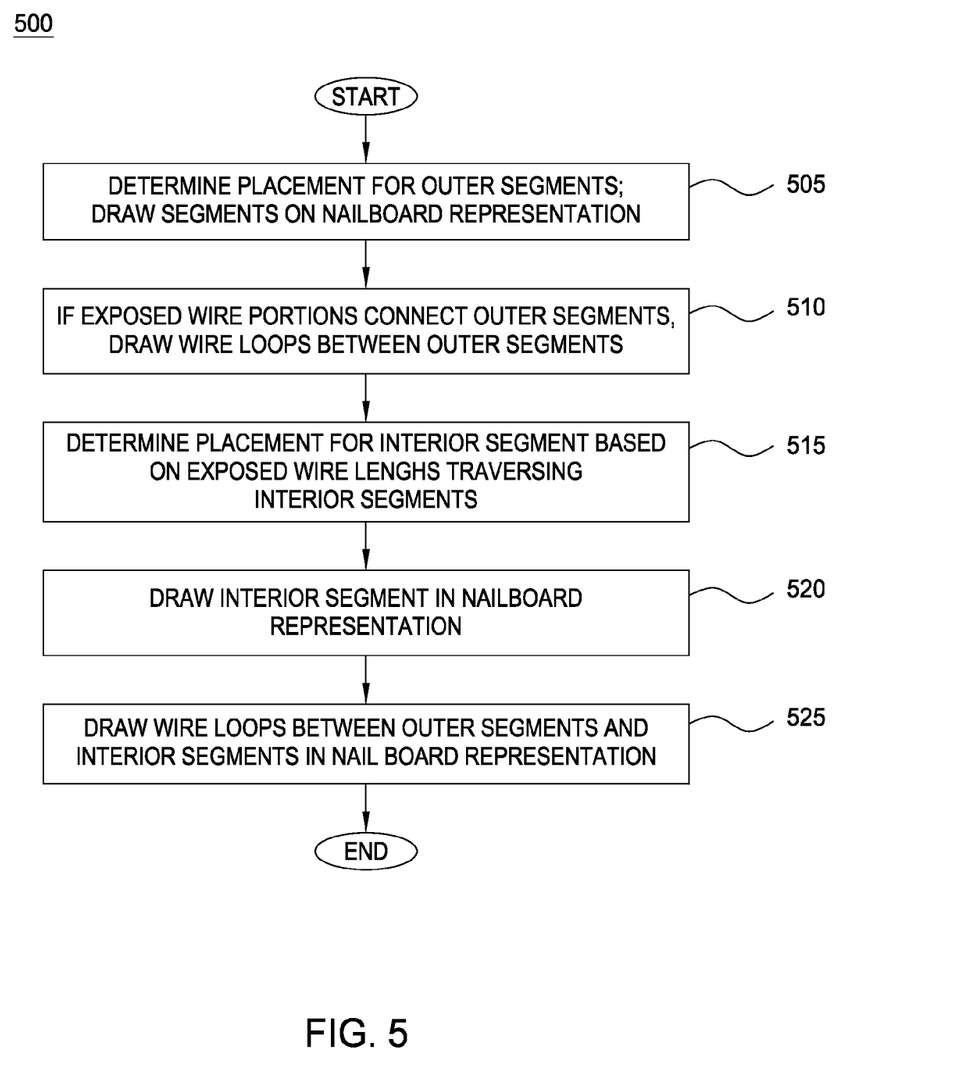
FIG. 5 illustrates a method for flattening a 3D CAD model of a wiring harness having a nested segment, according to one embodiment of the invention.

Another variation of a wiring harness includes one with a nested segment. For example, a wiring harness may include two outer segments and a nested segment in-between the two outer ones. Each segment represents a portion of a wiring harness where all the wires in that harness are routed along a common path. FIG. 5 illustrates a method 500 for flattening a 3D CAD model of a wiring harness that includes a nested segment, according to one embodiment of the invention. And example of flattening a wiring harness that includes a nested segment according to method 500 is provided in FIGS. 6A-6B.

As shown, method 500 begins at step 505 nailboard tool 116 determines a placement position for the outer segments of the wiring harness. In one embodiment, the outer segments may be drawn on the nailboard representation at a distance from one another corresponding to the length of the shortest exposed wire that connects the outer segments. If no exposed wire is routed from one outer segments to the other (i.e., all the wires are routed through a nested segment), then the distance between the outer segments may be determined based on the shortest exposed wire between the first outer segment and the nested segment, the length of the nested segment, and the length of the shortest exposed wire between the nested segment and the and the second outer segment.

At step 510, if exposed wire portions connect the outer segments of the wiring harness being flattened, then nailboard tool 116 may draw such exposed wire portions on the nailboard representation from the next shortest to the longest, according to the method of FIG. 3. At step 515, nailboard tool 116 may determine a placement position for the interior segment. In one embodiment, the position for the nested segment may be based on the exposed wire lengths of wire loops connecting the outer segments with the nested segments. At step 520, the interior segment is drawn in the nailboard representation being generated at the position determined at step 515. At step 525, if additional exposed wire portions are present connecting the nested segment to either of the outer segments of the wiring harness being flattened, then nailboard tool 116 may draw such wire portions on the nailboard representation from the next shortest to the longest, according to the method of FIG. 3.

Figure 6A:
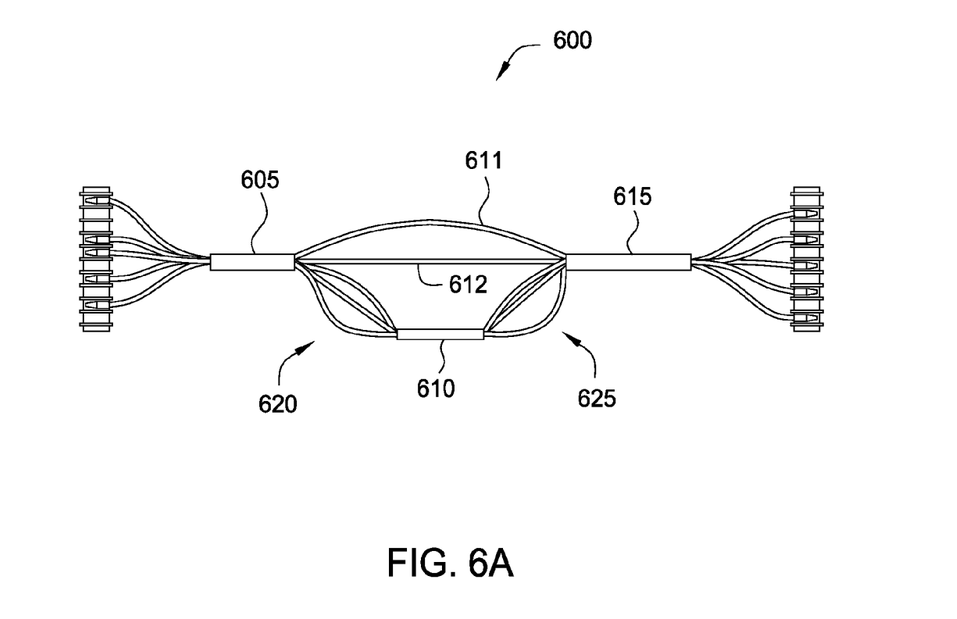
FIG. 6A-6B illustrate another example of a 3D model of a wiring harness and a flattened nailboard representation of that wiring harness, according to one embodiment of the invention.
Figure 6B:
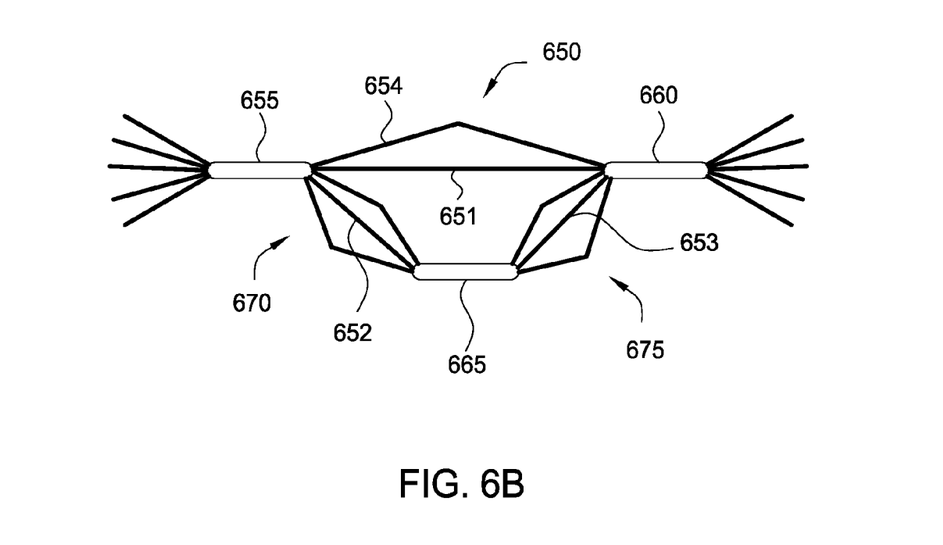

FIG. 6A illustrates a 3D model of a wiring harness 600 that includes a nested segment 610, and FIG. 6B illustrates a flattened nailboard view 650 of wiring harness 600, according to one embodiment of the invention. As shown, wiring harness 600 includes a first outer segment 605 and a second outer segment 615, one on each side of nested segment 610. Wires 611 and 612 are routed from first outer segment 605 to second outer segment 615. Additionally, wiring harness 600 includes a wire loop 620 between first outer segment 605 and nested segment 610 and a wire loop 625 between nested segment 610 and second outer segment 615. Wire loops 620 and 625 each include three exposed wire portions.

To flatten wiring harness 600, once the placement for first outer segment 605 and second outer segment 615 is determined, the outer segments are added to the nailboard view 650, which is shown in FIG. 6B as segments 655 and 660. In one embodiment, the distance between outer segments 655 and 660 equals the length of the shortest exposed wire portion routed between these two segments. In this example, wire 612 is the shortest wire connecting segments 605 and 615. This wire is shown in In flattened view 650, as a wire 651 connecting segments 655 and 660.

The position of segment 610 in nailboard view 650 may be determined using the shortest exposed wire portion routed from segment 605 to segment 610 (i.e., the shortest exposed wire of wire loop 620) and the shortest exposed wire portion routed from segment 610 to segment 615 (i.e., the shortest exposed wire of wire loop 625). Once the positions of segments 655, 660, and 665 are determined, the exposed wires of wiring harness 600 may be added to the nailboard view 650. In the present example, flattened segment 654 is drawn using a v-shape with sides of equal length. Flattened loops 670 and 675 are generated according to method 300 of FIG. 3. Thus, v-shape segments are added for each exposed wire in these loops, where the length of each flattened segments corresponds to the length of that wire in wiring harness 600. The position of each flattened wire of a wire loop is drawn on nailboard view 650 by adding exposed wires alternatively above and below the shortest wire of that wire loop.

Advantageously, the methods described may be used to generate a 2D flattened nailboard representation of a wiring harness in a 3D CAD model. The nailboard representation invention may be used to provide a dimensionally accurate "flattened" view of a complex 3D wiring harness depicted in a CAD model, without cutting any of the wires included in the harness, and minimizing the overlap of multiple exposed wires present in wire loops. Further, the methods for generating a 2D flattened nailboard representation of a wiring harness described herein may be adapted to account for a number of variations that may occur in a wire loop. For example, the wire loop may include multiple segments of equal length, or the wiring harness may include multiple wire loops separated by a nested segment.

While the foregoing is directed to embodiments of the present invention, other and further embodiments of the invention may be devised without departing from the basic scope thereof, and the scope thereof is determined by the claims that follow.

What is claimed is:

1. A method for generating a two-dimensional (2D) flattened nailboard representation of a wiring harness in a three-dimensional (3D) computer-aided design (CAD) model, comprising:
    identifying a wire-loop in the wiring harness, wherein the wire-loop includes a plurality of exposed wires connecting a first segment and a second segment of the wiring harness, and wherein the first segment and the second segment represent a portion of the wiring harness where the plurality of exposed wires are routed along a common path;
    identifying a shortest wire within the plurality of exposed wires;
    determining a position for the first segment and the second segment in the nailboard representation based on the length of the shortest wire, wherein a distance between the first segment and the second segment is equal to the length of the shortest wire;
    adding the first segment and the second segment to the nailboard representation at the determined positions;
    adding each of the plurality of exposed wires of the wire loop to the nailboard representation as a contiguous sequence of linear segments, wherein the length of the contiguous sequence of linear segments for each of the plurality of exposed wires in the nailboard representation equals a length of a corresponding wire in the wiring harness; and
    storing the nailboard representation of the wiring harness in the 3D CAD model.

2. The method of claim 1, wherein a shortest of the plurality of exposed wires is added to the nailboard representation as a linear segment connecting the first segment and the second segment.

3. The method of claim 2, wherein each of the remaining plurality of exposed wires is added to the nailboard representation using two linear segments of equal length forming a v-shape.

4. The method of claim 2, wherein each of the remaining plurality of exposed wires is added to the nailboard representation at a position that alternates between being above and below the single linear segment connecting the first segment and the second segment.

5. The method of claim 1, wherein the plurality of exposed wires includes two or more wires of equal length, and wherein the contiguous sequence of one or more linear segments for the two or more wires are added to the nailboard representation using linear segments of unequal length.

6. The method of claim 1, wherein the wiring harness includes a nested segment in-between the first segment and the second segment, wherein each of the plurality of exposed wires is routed along a common path through the length of the nested segment, and wherein a first wire loop occurs between the first segment and the nested segment, and a second wire loop occurs between the second segment and the nested segment.

7. A computer-readable storage medium storing instructions that when executed by a processor cause the processor to generate a two-dimensional (2D) flattened nailboard representation of a wiring harness in a three-dimensional (3D) computer-aided design (CAD) model, by performing the steps of:
    identifying a wire-loop in the wiring harness, wherein the wire-loop includes a plurality of exposed wires connecting a first segment and a second segment of the wiring harness, and wherein the first segment and the second segment represent a portion of the wiring harness where the plurality of exposed wires are routed along a common path;
    identifying a shortest wire within the plurality of exposed wires;
    determining a position for the first segment and the second segment in the nailboard representation based on the length of the shortest wire, wherein a distance between the first segment and the second segment is equal to the length of the shortest wire;
    adding the first segment and the second segment to the nailboard representation at the determined positions;
    adding each of the plurality of exposed wires of the wire loop to the nailboard representation as a contiguous sequence of linear segments, wherein the length of the contiguous sequence of linear segments for each of the plurality of exposed wires in the nailboard representation equals a length of a corresponding wire in the wiring harness; and
    storing the nailboard representation of the wiring harness in the 3D CAD model.

8. The computer-readable storage medium of claim 7, wherein the shortest of the plurality of exposed wires is added to the nailboard representation as a linear segment connecting the first segment and the second segment.

9. The computer-readable storage medium of claim 8, wherein each of the remaining plurality of exposed wires is added to the nailboard representation using two linear segments of equal length forming a v-shape.

10. The computer-readable storage medium of claim 8, wherein each of the remaining plurality of exposed wires is added to the nailboard representation at a position that alternates between being above and below the single linear segment connecting the first segment and the second segment.

11. The computer-readable storage medium of claim 7, wherein the plurality of exposed wires includes two or more wires of equal length, and wherein the contiguous sequence of one or more linear segments for the two or more wires are added to the nailboard representation using linear segments of unequal length.

12. The computer-readable storage medium of claim 7, wherein the wiring harness includes a nested segment in-between the first segment and the second segment, wherein each of the plurality of exposed wires is routed along a common path through the length of the nested segment, and wherein a first wire loop occurs between the first segment and the nested segment, and a second wire loop occurs between the second segment and the nested segment.

13. A method for generating a two-dimensional (2D) flattened nailboard representation of a wiring harness in a three-dimensional (3D) computer-aided design (CAD) model, comprising selecting the wire harness in the 3D CAD model; and
invoking a nailboard generation tool provided by a CAD application, wherein the nailboard generation tool is configured to:
identify a wire-loop in the wiring harness, wherein the wire-loop includes a plurality of exposed wires connecting a first segment and a second segment of the wiring harness, and wherein the first segment and the second segment represent a portion of the wiring harness where the plurality of exposed wires are routed along a common path;
identify a shortest wire within the plurality of exposed wires;
determine a position for the first segment and the second segment in the nailboard representation based on the length of the shortest wire, wherein a distance between the first segment and the second segment is equal to the length of the shortest wire;
add the first segment and the second segment to the nailboard representation at the determined positions;
add each of the plurality of exposed wires of the wire loop to the nailboard representation as a contiguous sequence of linear segments, wherein the length of the contiguous sequence of linear segments for each of the plurality of exposed wires in the nailboard representation equals a length of a corresponding wire in the wiring harness; and
store the nailboard representation of the wiring harness in the 3D CAD model.

14. The method of claim 13, wherein the shortest of the plurality of exposed wires is added to the nailboard representation as a linear segment connecting the first segment and the second segment.

15. The method of claim 14, wherein each of the remaining plurality of exposed wires is added to the nailboard representation using two linear segments of equal length forming a v-shape.

16. The method of claim 14, wherein each of the remaining plurality of exposed wires is added to the nailboard representation at a position that alternates between being above and below the single linear segment connecting the first segment and the second segment.

17. The method of claim 13, wherein the plurality of exposed wires includes two or more wires of equal length, and wherein the contiguous sequence of one or more linear segments for the two or more wires are added to the nailboard representation using linear segments of unequal length.

18. The method of claim 13, wherein the wiring harness includes a nested segment in-between the first segment and the second segment, wherein each of the plurality of exposed wires is routed along a common path through the length of the nested segment, and wherein a first wire loop occurs between the first segment and the nested segment, and a second wire loop occurs between the second segment and the nested segment.

* * * * *